(12) United States Patent
Keshavaraj et al.

(10) Patent No.: US 7,287,478 B2
(45) Date of Patent: Oct. 30, 2007

(54) METHOD FOR MANUFACTURING AN AIRBAG CUSHION

(75) Inventors: Ramesh Keshavaraj, Peachtree City, GA (US); Michael D. Hurst, LaGrange, GA (US); William J. Martin, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/808,198

(22) Filed: Mar. 24, 2004

(65) Prior Publication Data

US 2004/0232682 A1    Nov. 25, 2004

Related U.S. Application Data

(62) Division of application No. 10/041,376, filed on Jan. 8, 2002.

(51) Int. Cl.
*B32B 7/08* (2006.01)
*B60R 21/16* (2006.01)

(52) U.S. Cl. ............... 112/423; 112/402; 112/422; 270/37; 280/728.1; 442/286

(58) Field of Classification Search ............... 112/402, 112/405, 412, 422, 423, 424, 425, 426, 427, 112/441; 270/37; 280/728.1; 428/34.5, 428/34.6, 34.7, 35.7, 35.9; 442/183, 189, 442/191, 249, 277, 286
See application file for complete search history.

(56) References Cited

U.S. PATENT DOCUMENTS

| | | | |
|---|---|---|---|
| 3,842,583 A | 10/1974 | Gage | 57/140 R |
| 5,236,775 A | 8/1993 | Swoboda et al. | 428/219 |
| 5,296,278 A | 3/1994 | Nishimura et al. | 428/36.1 |
| 5,356,680 A | 10/1994 | Krummheuer et al. | 428/36.1 |
| 5,470,106 A | 11/1995 | Nishimura et al. | 428/36.1 |
| 5,508,073 A | 4/1996 | Krummheuer et al. | 428/35.1 |
| 5,826,905 A | 10/1998 | Tochacek et al. | 280/743.1 |
| 5,879,800 A | 3/1999 | Geirhos | 428/370 |
| 5,902,672 A | 5/1999 | Swoboda et al. | 442/203 |
| 6,106,038 A * | 8/2000 | Dreher | 293/118 |
| 6,569,788 B1 | 5/2003 | Hurst et al. | 442/168 |
| 2002/0020992 A1 | 2/2002 | Kanuma | 280/730.2 |
| 2002/0082377 A1 | 6/2002 | Bohin | 528/15 |
| 2003/0008582 A1 | 1/2003 | Koetsu et al. | 442/195 |
| 2003/0060103 A1 | 3/2003 | Nagaoka et al. | 442/59 |

FOREIGN PATENT DOCUMENTS

WO    WO 01/98115    12/2001

OTHER PUBLICATIONS

International Search Report PCT/US02/40668 filed Dec. 18, 2002 for "Airbag Made From Low Tenacity Yarns".

* cited by examiner

*Primary Examiner*—Arti Singh
(74) *Attorney, Agent, or Firm*—Terry T. Moyer; John E. Vick, Jr.

(57) ABSTRACT

An airbag cushion having a novel seam structure including either a tri-stitch fold-over seam structure or a double-stitch fold-over seam structure. The novel seam structure allows airbag cushions to be manufactured by using low tenacity yarns, preferably in the range of between about 40 cN/tex and about 65 cN/tex.

17 Claims, 5 Drawing Sheets

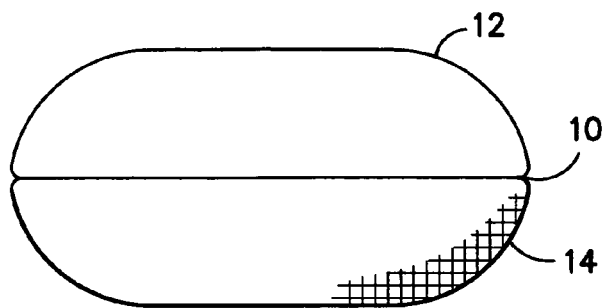
FIG. −1A−
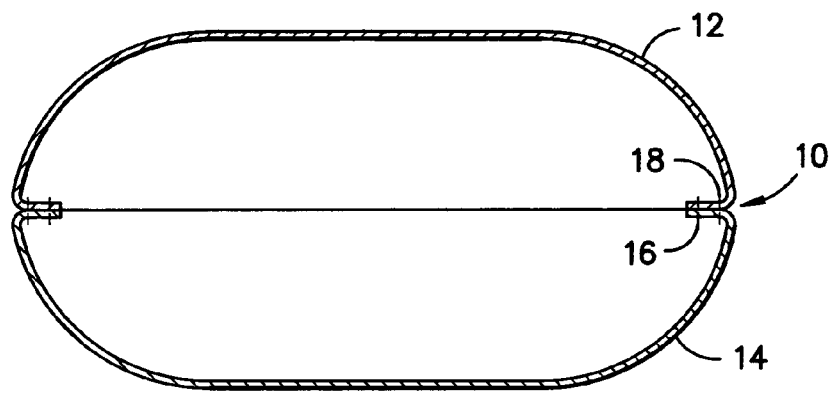
FIG. −1B−
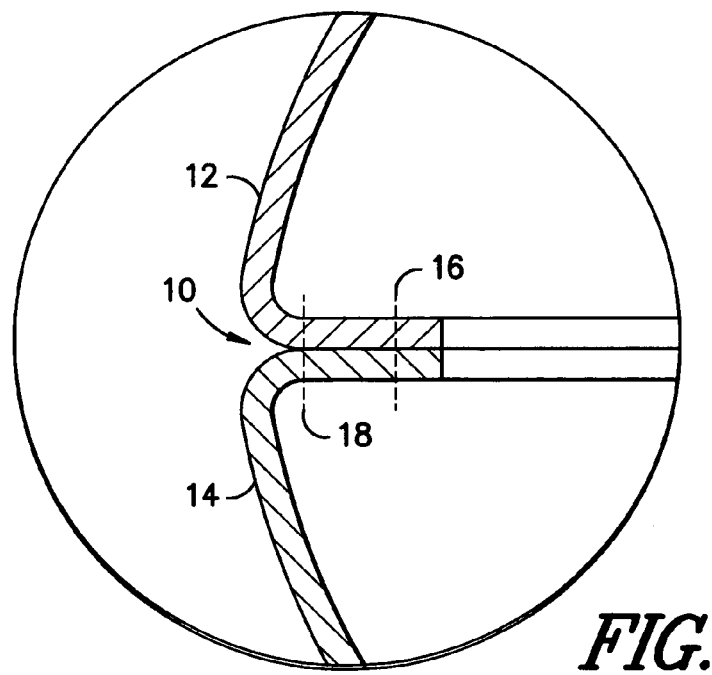
FIG. −1C−

FIG. -2A-
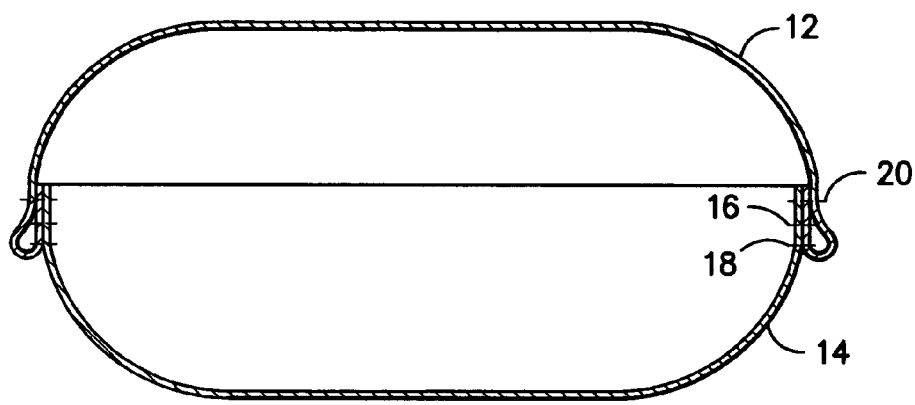
FIG. -2B-
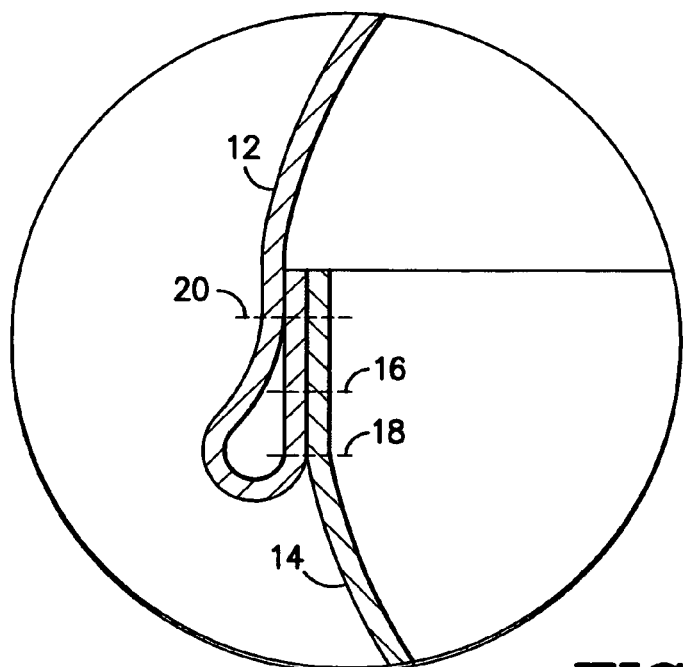
FIG. -2C-

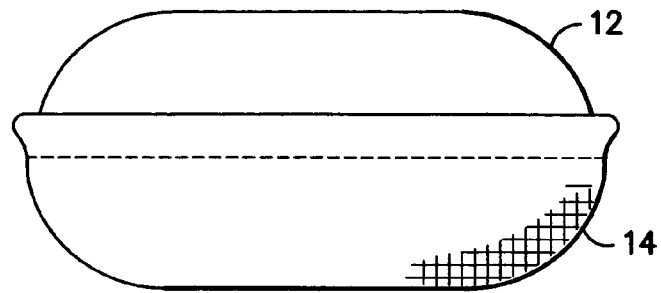
FIG. -3A-
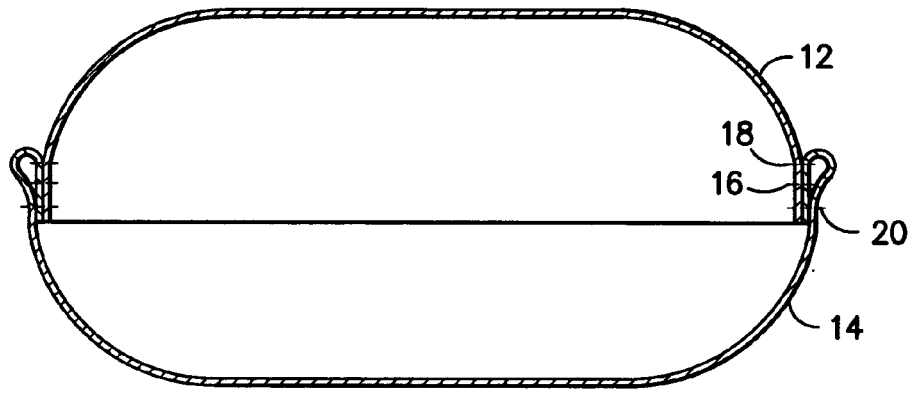
FIG. -3B-
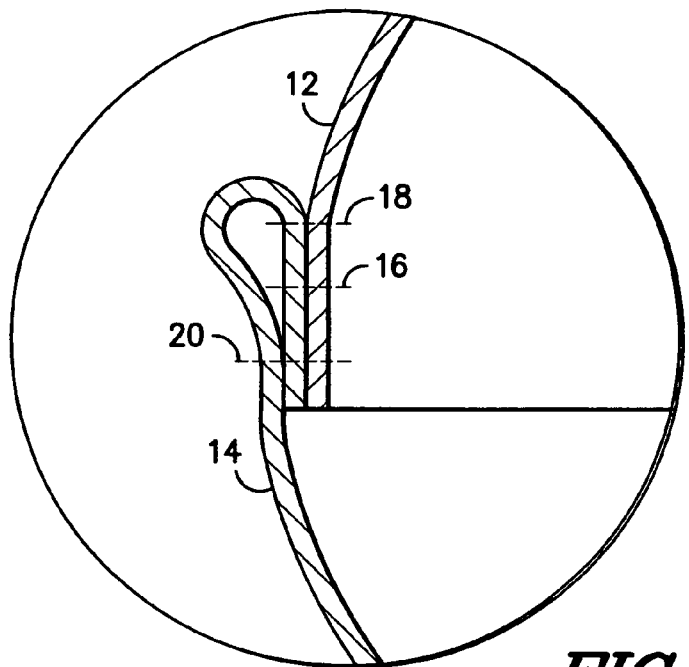
FIG. -3C-

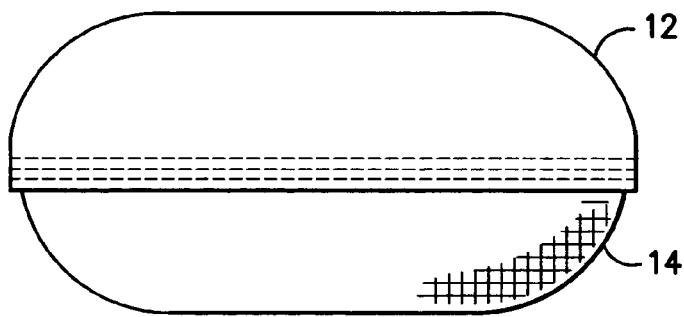
FIG. -4A-
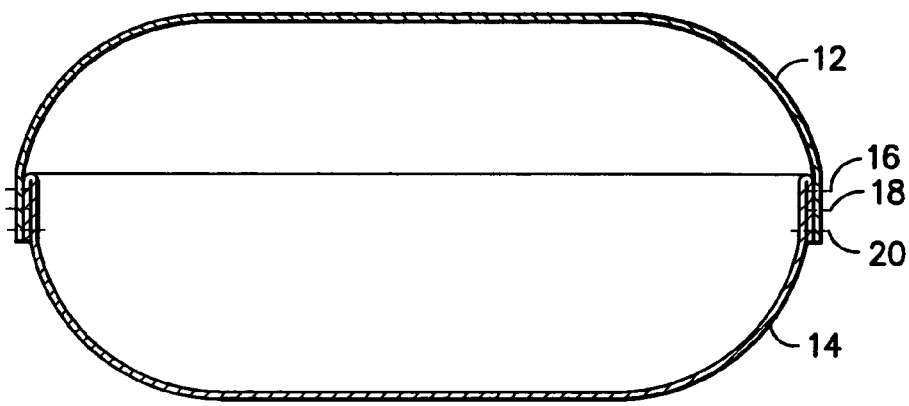
FIG. -4B-
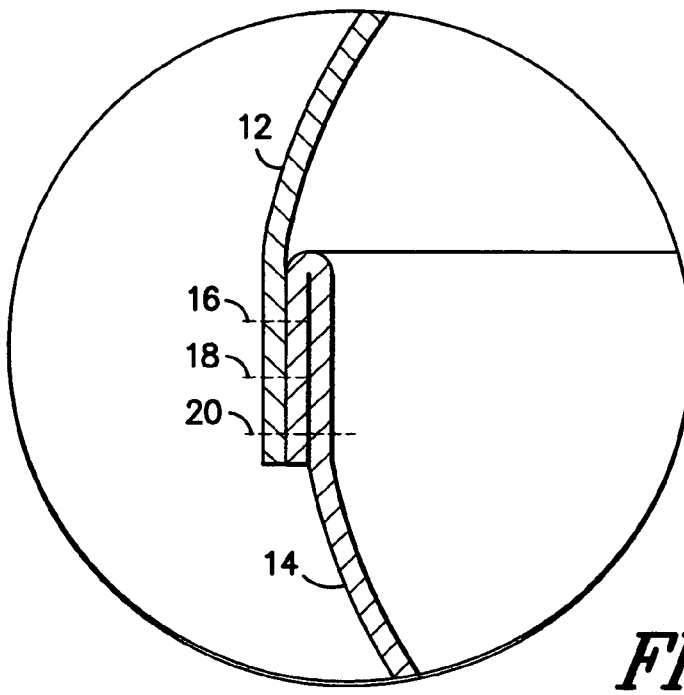
FIG. -4C-

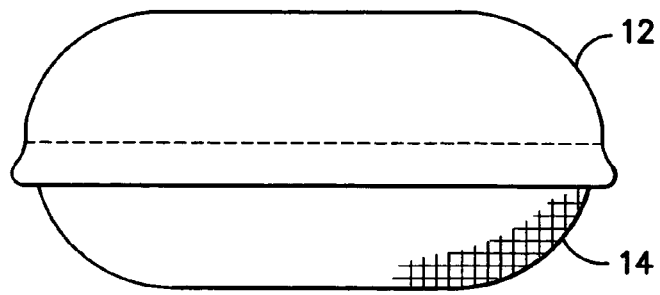
FIG. —5A—
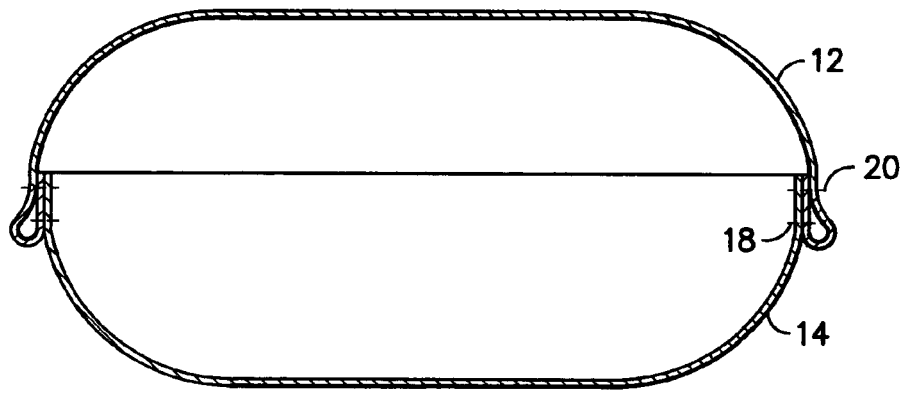
FIG. —5B—
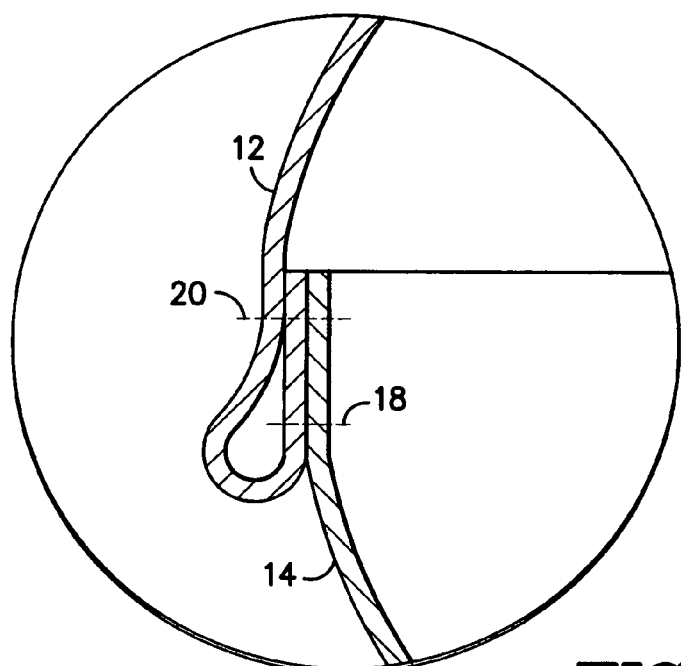
FIG. —5C—

METHOD FOR MANUFACTURING AN AIRBAG CUSHION

CROSS-REFERENCED TO RELATED APPLICATIONS

This application is a divisional of pending U.S. patent application Ser. No. 10/041,376, filed on Jan. 8, 2002, which is hereby incorporated herein in its entirety by specific reference thereto.

BACKGROUND OF THE INVENTION

Airbag systems function by employing a sensor to detect a collision event, which triggers an inflator component to inflate the airbag cushion at high pressure. As a result of this process, the airbag cushion is subjected to a sudden and violent increase in gas pressure, which is then compounded by the impact of a vehicle occupant exerting external pressure against the airbag cushion. In order for the airbag cushion to protect occupants in a vehicle, it is necessary for the airbag to exhibit high burst strength.

Heretofore, various attempts have been made to manufacture an airbag cushion that is strong, robust, and exhibits high burst strength. One generally accepted method for manufacturing such cushions is by utilizing high tenacity multifilament yarns having tenacity of greater than 8.0 grams/denier (g/den).

Japanese unexamined patent publication no. 4-5,145 teaches a non-circular airbag made from hollow weave fabrics having an axis length thereof in a direction at a bias angle of 45 degrees from the warp direction, corresponding to 70 to 95% of the axis length thereof in the warp and weft direction.

Japanese unexamined patent publication no. 4-43,143 discloses an airbag made from non-circular hollow weave fabric pieces having a longer axis in a direction inclined at a bias angel from the warp or weft direction than an axis in the warp direction of the fabric pieces.

These attempts are based on the idea that a starting point in bursting of the airbag cushion resides in a seam-joining portion in a circumferential edge portion of the cushion, and provided a cushion made from non-circular woven fabric pieces having shorter axis in a bias direction than that in the warp or weft direction, to enhance the burst strength of the seam-joining portion.

U.S. Pat. No. 5,470,106 discloses the use of a woven fabric apron at the area surrounding the inflator connection to improve burst strength. Other attempts to improve burst strength have included the use of adhesive means to reinforce the weaker areas of the airbag. U.S. Pat. No. 5,296,278 teaches that bags having yarns with tensile strength measurements of less than 8.0 g/den (approximately 70 cN/tex or centi Newton/tex) do not perform well. This reference also discloses a means for applying silicone rubber at the seams to prevent fraying of the coated fabric to prevent failure at the seams.

Most of the efforts to improve the burst strength of airbag cushions have been focused on using high tenacity yarns, occasionally in combination with some other means or method for increasing seam strength. However, none of the prior art has provided an airbag cushion having a novel seam and low tenacity yarns in combination to provide high burst strength. One advantage to using low tenacity yarns in airbag cushion applications is that low tenacity yarns generally may be manufactured or purchased at a lower cost than high tenacity yarns.

OBJECTS OF THE INVENTION

Accordingly, it is an object of the present invention to provide an airbag cushion employing yarns having tenacity of less than 70 cN/tex while maintaining high burst strength.

Another object of the present invention is to provide an airbag cushion having a novel seam construction that allows an airbag cushion to be manufactured using low tenacity yarns without sacrificing acceptable levels of burst strength.

Still another object of the present invention is to provide a method for manufacturing an airbag cushion using yarns having tenacity of less than 70 cN/tex while maintaining high burst strength.

Yet another object of the present invention is to provide an airbag cushion that is inexpensive to manufacture, and which overcomes some of the problems commonly associated with other airbag cushions.

BRIEF DESCRIPTION OF THE DRAWINGS

These and other features, aspects, and advantages of the present invention will become better understood with regard to the following description, appended claims, and accompanying drawings where:

FIG. 1A is a side view of a traditional seam structure utilized on airbag cushions;

FIG. 1B is a cross-sectional view of the traditional seam structure shown in FIG. 1A;

FIG. 1C is a magnified cross-sectional view of the traditional seam structure shown in FIG. 1B;

FIG. 2A is a side view of an airbag cushion having a novel tri-stitch fold-over seam structure;

FIG. 2B is a cross-sectional view illustrating the novel tri-stitch fold-over seam structure shown in FIG. 2A;

FIG. 2C is a magnified cross-sectional view of the novel tri-stitch fold-over seam structure shown in FIG. 2B;

FIG. 3A is a side view of an alternate embodiment of the airbag cushion shown in FIGS. 2A-2C, where the seam direction is reversed;

FIG. 3B is a cross-sectional view illustrating the novel tri-stitch fold-over seam structure in the reverse direction;

FIG. 3C is a magnified cross-sectional view illustrating the novel tri-stitch fold-over seam structure in the reverse direction;

FIG. 4A is a side view of another embodiment of an airbag cushion having a novel tri-stitch fold-over seam, where the folded over portion of the seam is on the inner portion of the bag;

FIG. 4B is a cross-sectional view illustrating the novel tri-stitch fold-over seam shown in FIG. 4A;

FIG. 4C is a magnified cross-sectional view illustrating the novel tri-stitch fold-over seam structure shown in FIG. 4B;

FIG. 5A is a side view of another embodiment of an airbag cushion having a novel double-stitch fold-over seam;

FIG. 5B is a magnified cross-sectional view illustrating the novel double-stitch fold-over seam shown in FIG. 5A;

FIG. 5C is a magnified cross-sectional view illustrating the novel double stitch fold-over seam structure shown in FIG. 5B.

DESCRIPTION

Airbag cushions typically comprise at least two fabric panels, each having a desired shape, sewn together to form a three-dimensional structure. FIGS. 1A-1C show a traditional double needle chain stitch seam structure 10 that has been commonly employed as a means for joining together fabric blanks that form airbag cushions. A first fabric blank 12 is joined to a second fabric blank 14 by means of an inner stitch 16 and an outer stitch 18. The double needle chain stitch structure has been used in the past because a single stitch did not provide enough seam strength, and the burst strength of a bag employing such a seam structure suffered from unacceptably low burst strength.

One problem associated with the double needle chain stitch seam structure is that the high pressure caused by an airbag inflator causes the seam to tend toward peeling open (a condition referred to herein as the peel mode). FIG. 1C shows the double needle chain stitch seam structure under stress in the peel mode. When the cushion expands due to the inflation pressure, the inner stitch receives the maximum stress, which sometimes results in the needle penetration holes formed by the inner stitch becoming susceptible to heat erosion from the got inflation gases. The strength of the seams during the peel mode equals only about 60% to 70% of the strength of the fabric.

In order to improve the seam strength of the double needle chain stitch seam structure, thus increasing the burst strength of the airbag cushion, a third stitch 20 was added to the seam structure as shown in FIGS. 2A-2C. The third stitch 20 joins the first and second fabric blanks together, similarly to the inner stitch 16 and the outer stitch 18, but also joins the first fabric blank back onto itself in a folded manner as shown. Such an arrangement converts the stress condition on the seam structure from a peel mode to a shear mode, which spreads the stress load over multiple stitches within the seam, rather than having a single stitch bear the entire stress load. This seam arrangement, referred to herein as a tri-stitch fold-over seam (or tri-stitch), provides 100% of the fabric strength at the seams, and protects the inner 16 and outer stitches 18 against hot gas erosion. Thus, the only possible gas leak area, between the inner 16 and outer stitches 18, is covered by a double layer of fabric.

Alternate embodiments are shown in FIGS. 3A-3C, where the second fabric panel is folded over onto itself, rather than the first fabric panel being folded over, as shown in FIGS. 2A-2C. FIGS. 4A-4C illustrate another alternate embodiment of the tri-stitch fold-over seam structure, where the second fabric panel is folded over onto itself, and where the folded portion is on the inside of the cushion rather than the outside of the airbag cushion. FIGS. 5A-5C illustrate an alternate embodiment of the novel seam structure, which is a double-stitch fold-over seam. In this embodiment, instead of applying two parallel seams to attach the fabric blanks prior to the fold-over step, the fabric blanks are attached using a single seam, and then the fabric seam is folded over and connected using a fold-over seam, as shown.

Using the tri-stitch fold-over seam or the double-stitch fold-over seam as described above allows airbag cushions to be manufactured with low tenacity yarns, where the use of such low tenacity yarns has not been possible in prior airbag cushion applications. Because the tri-stitch and double-stitch fold-over seams (collectively called "shear seams" herein) significantly strengthens the seam of the cushion, the necessity of using of high tenacity yarns in order to maintain acceptable burst strength levels for airbag cushions is obviated.

One preferred yarn is polyester. The preferred tenacity range is between about 60 cN/tex and about 35 cN/tex. A second preferred range is about 50 cN/tex and about 40 cN/tex. The most preferred range is about 55 cN/tex and about 45 cN/tex. Although a specific yarn type has been disclosed, it is to be understood that any suitable yarn may be used.

The effectiveness of the seam as related to burst strength is illustrated in the following examples:

EXAMPLE 1

Comparison of Low Tenacity vs. High Tenacity Using Traditional Stitch

A multifilament 620d polyester yarn of tenacity 5.1 g/den (45 cN/tex) was woven in the water-jet loom in a plain weave with a construction of 40×40 yarns per inch. This fabric was then calendared to achieve surface smoothness and coated with silicone rubber at a weight of 0.74 oz/sq. yd. A comparison of physical properties of this low tenacity fabric is shown in the following table along with a typical 630d nylon 6,6 silicone coated airbag fabric.

TABLE 1

Physical Properties of Airbag Fabrics

|  |  | 630d NY 6,6 Airbag Fabric | 620d PET-Low Tenacity Fabric |
|---|---|---|---|
| Yarn Tenacity | g/den. | 9.3 | 5.1 |
| Fabric construction, W/F | Per inch | 41/40 | 40/40 |
| Fabric total weight | Oz/sq. yd. | 8.06 | 6.89 |
| Coating Add-on | Oz/sq. yd. | 1.1 | 0.74 |
| Grab Tensile, W/F | Lbs/inch | 611/585 | 487/499 |
| Elongation, W/F | % | 35.1/37.1 | 38.4/35.2 |
| Tongue Tear, W/F | Lbs. | 50/55 | 42.5/53 |
| Flammability | In/min | No Burn Rate | No Burn Rate |
| King Stiffness | Lbs | 2.4 | 1.9 |
| Fabric Modulus | Lbs/inch | 960 | 720 |

Tethered driver airbags of 52 L volume was made from both of the above fabrics using the typical seaming techniques as shown in FIG. 1. Two circular shaped panels were sewn along the perimeter with a double needle chain stitch. After the bags are turned inside out as shown, the perimeter seams are in the peel mode.

Airbag cushions manufactured using the above fabrics (one cushion made from high tenacity yarns, and one made from low tenacity yarns) employing traditional double needle chain stitch sewing techniques were tested with a 220-kPa-driver inflator statically and under loading. Nylon 6,6 bags performed well as expected, but the low tenacity polyester bags exhibited heat erosion at the perimeter seams resulting in considerable loss of pressure. Effective restraint functionality was lost in the low tenacity polyester bags because of the steep pressure decay (<1.0 Psi at 45 msec). Even though the polyester fabric was coated, the uncoated side of the yarns gets exposed very easily to heat because of higher elongation at the seams with the low tenacity yarns. Also, with the heat capacity of Polyester being 1.5 kJ/kg. K compared to 1.7 kJ/kg. K for nylon, it is desirable to protect the uncoated side of the yarn at the seams and improve the seam overall.

EXAMPLE 2

Cushion Performance (High Tenacity vs. Low Tenacity) Using Tri-Stitch

The tri-stitch fold-over seam modification was implemented on sets of 52 L driver bags made from silicone coated fabric woven with the low tenacity polyester yarns and high tenacity Nylon 6,6 yarns, respectively. As before, these bags were tested statically and under load with the same 220 kPa driver inflator as before. Test results are summarized in the following Table 2.

TABLE 2

Bag Performance Parameters

| BAG TYPE | Average Peak Bag Pressure (Psi) |
|---|---|
| 630d NY 6,6 with tri-stitch fold-over seam (Shear seam) | 10.85 |
| 630d NY 6,6 traditional seam (Peel seam) | 9.5 |
| 620d PET with tri-stitch fold-over seam (Shear seam) | 11.9 |
| 620d PET traditional seam (Peel seam) | <1.0 |

Restraint functionality in terms of energy absorption for the new bag with low tenacity yarns was equivalent or better than traditional airbags made from high tenacity yarns. Visual inspection of the bags did not reveal any sign of heat erosion at the seams

EXAMPLE 3

Drop Tests

A set of airbag cushions were manufactured using 630d Nylon 6,6 at a construction of 41×41 yarns per inch for the control group, and fabric that was woven with low tenacity (4.8 g/den) polyester yarn of 620d at a construction of 40×40 yarns per inch was used to manufacture a second set of airbag cushions. Both the fabrics were woven on the waterjet loom and were silicone coated at a coating weight of 0.7 oz./sq. yd. All of the polyester cushions had the tri-stitch fold-over seam construction as shown in FIG. 3. The inflator used for these tests was a 231 kPa inflator (in 60 L tank test) which is considered to be an aggressive inflator in the airbag industry.

Drop tests were conducted on the airbags by dropping a weight of 75 lbs. from a height of 6 feet onto the inflated bag. The 12 inch×24 inch surface of the weight facing the bag was in the horizontal plane and the weight was constrained so it could move only up or down in the vertical direction. The peak deceleration rate as well as the peak-rebound height of the weight was recorded.

TABLE 3

Drop Test with Inflator (average of 6 bags each)

| | Bag Pressure (Psi) | Peak G's | Rebound Distance (in) | Compression Distance (in) |
|---|---|---|---|---|
| 630d Nylon 6,6 Airbag-traditional seam | 10.2 | 20.8 | 27.5 | 5.84 |
| 620d Low Tenacity PET Airbag-tri stitch fold-over seam | 11.4 | 16 | <10 | 5.43 |

The peak deceleration experienced by an object being brought to rest by an airbag is an important parameter in determining airbag performance. The peak deceleration measured in G's (multiples of the standard acceleration due to gravity) multiplied by the body weight gives the force exerted on the body to bring it to rest. Another important parameter is the amount of rebound experienced by an object after it is brought to rest. This parameter is a measure of energy imparted to the object by the airbag after bringing the object to rest and plays a role in possible secondary injury such as whiplash.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for manufacturing an airbag cushion, said cushion being adapted for restraining an occupant in the interior of a transportation vehicle during a collision, said method comprising the steps of:
   (a) providing first and second fabric blanks;
   (b) folding said first fabric blank upon itself to form a folded portion;
   (c) stitching said first and second fabric blanks together at said folded portion of said first fabric blank, wherein said first and second fabric blanks are joined by at least one first stitch, wherein said first stitch connects said second fabric blank to said first fabric blank by proceeding through said first fabric blank at a minimum of two different locations upon said first fabric blank, wherein said first and second fabric blanks are joined to form a tri-stitch fold-over seam structure.

2. The method set forth in claim 1, further including the steps of:
   (d) stitching said first and second fabric blanks to each to each other by employing a second stitch, said second stitch connecting said first fabric blank to said second fabric blank.

3. The method set forth in claim 1, further including the step of applying a coating to at least one surface of said airbag cushion.

4. The method set forth in claim 3, wherein said coating comprises at least 70% silicone resin in an amount of about 0.5 to 2.0 oz/sq. yd.

5. The method set forth in claim 1, wherein at least one of said fabric blanks includes multifilament yarns having a tenacity of no greater than about 60 cN/tex.

6. The method set forth in claim 2, wherein said method further comprises the step of:
   (e) stitching said first and second fabric blanks to each to each other by employing a third stitch, said third stitch connecting said first fabric blank to said second fabric blank.

7. The method set forth in claim 1, wherein at least one of said fabric blanks includes multifilament yarns having a tenacity of no greater than about 50 cN/tex.

8. The method set forth in claim 1, wherein at least one of said fabric blanks includes multifilament yarns having a tenacity of no greater than about 45 cN/tex.

9. The method set forth in claim 1, wherein at least one of said fabric blanks includes multifilament yarns having a tenacity of no greater than about 40 cN/tex.

10. A method for manufacturing an airbag cushion adapted for use upon an interior occupant of a transportation vehicle, said method comprising the steps of:
   providing first and second fabric blanks;
   folding said first fabric blank to form a folded portion of said first fabric blank;
   applying said folded portion of said first fabric blank upon said second fabric blank;
   stitching together said first and second fabric blanks in at least two stitch locations to form a seam, said seam comprising a double-stitch fold-over seam structure.

11. The method set forth in claim 10, further including the step of applying a coating to at least one surface of said airbag cushion.

12. The method set forth in claim 11, wherein said coating comprises at least 70% silicone resin in an amount of about 0.5 to 2.0 oz/sq. yd.

13. The method set forth in claim 10, wherein at least one of said fabric blanks includes multifilament yarns having a tenacity of no greater than about 60 cN/tex.

14. The method set forth in claim 10 wherein at least one of said fabric blanks includes multifilament yarns having a tenacity of no greater than about 55 cN/tex.

15. The method set forth in claim 10 wherein at least one of said fabric blanks includes multifilament yarns having a tenacity of no greater than about 50 cN/tex.

16. The method set forth in claim 10, wherein at least one of said fabric blanks includes multifilament yarns having a tenacity of no greater than about 45 cN/tex.

17. The method set forth in claim 10, wherein at least one of said fabric blanks includes multifilament yarns having a tenacity of no greater than about 40 cN/tex.

* * * * *